United States Patent Office 3,672,825
Patented June 27, 1972

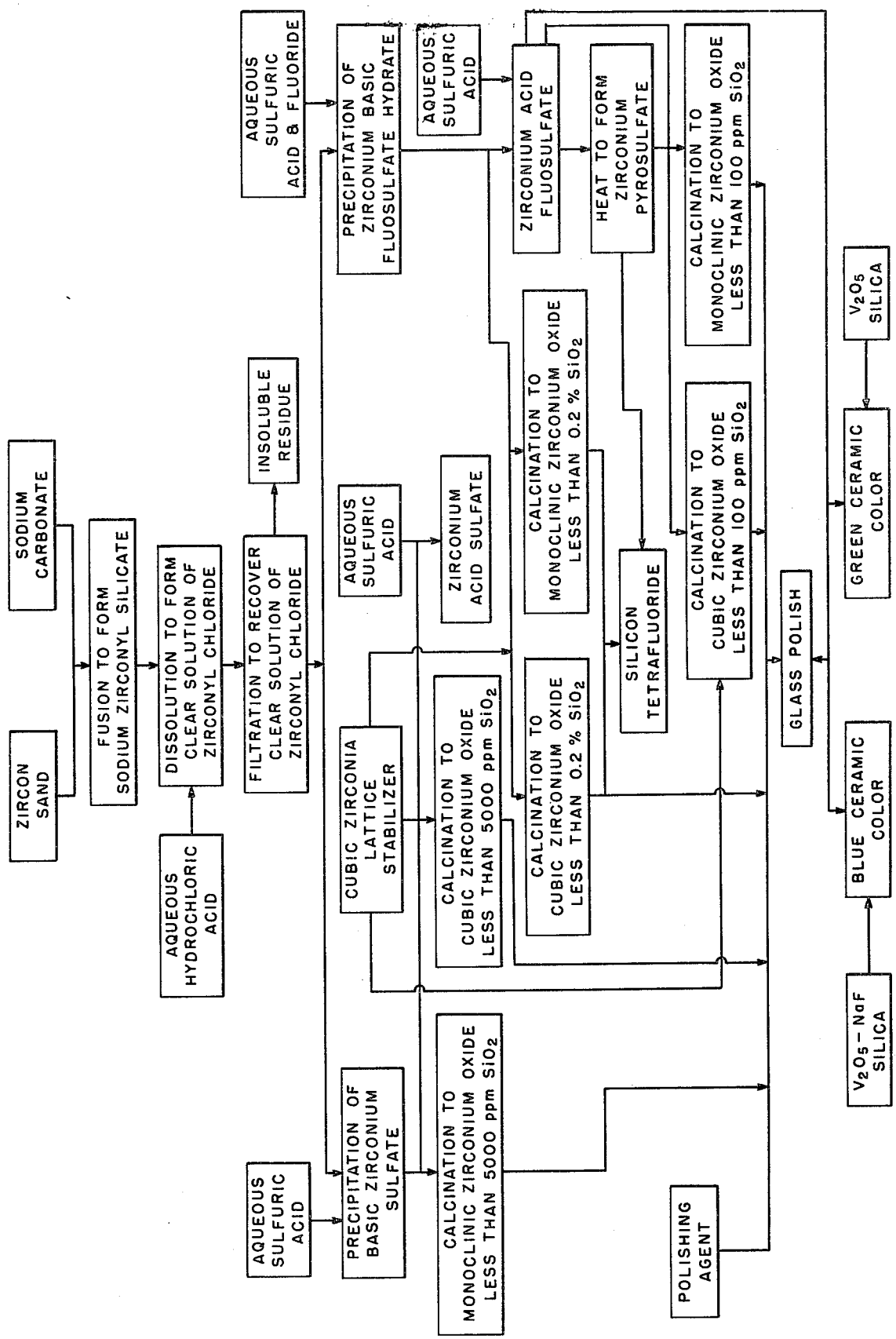

---

3,672,825
PROCESS FOR PREPARING BASIC ZIRCONIUM SULFATES AND OTHER ZIRCONIUM COMPOUNDS SUCH AS ZIRCONIUM FLUOSULFATES, AND COMPOSITIONS CONTAINING THE SAME
James Richard Gambale, Media, Pa., and Glenn Hazel McIntyre, Jr., and Fredrik J. Ranney, Pennington, N.J., assignors to Tizon Chemical Corporation, Flemington, N.J.
Filed Feb. 16, 1970, Ser. No. 11,624
Int. Cl. C22b 59/00
U.S. Cl. 23—15 R
12 Claims

ABSTRACT OF THE DISCLOSURE

A process is provided for preparing zirconium sulfates by fusing a zirconium siliceous ore, such as zircon sand, with an alkali metal carbonate or hydroxide to form an alkali metal zirconylosilicate, and/or alkali metal zirconate, and silicate, which is dissolved in aqueous hydrochloric acid to form a clear solution of zirconyl chloride and silicic acid. An aqueous sulfate solution is added, and the mixture heated to precipitate a zirconium sulfate. This can be calcined to form zirconium oxide. If fluoride is added with the sulfate solution, a series of basic and acidic zirconium fluosulfates can be obtained useful as a glass polishing additive. The zirconium fluosulfates can also be calcined, to form a very pure zirconium oxide.

A process also is provided for preparing a zirconium oxide having a very low proportion of silica, by calcining a zirconium compound comprising silica in the presence of fluorine or a fluoride.

---

Zirconium oxide has recently come into wide use inter alia as a polishing agent for glass and crystalline silicon, germanium and other semi-conductor materials. It is prepared from zircon sand via basic zirconium sulfate. The zircon sand (a zirconium silicate) is fused with sodium carbonate to sodium zirconylosilicate, which is dissolved in a strong acid such as hydrochloric acid containing more than 20% HCl. Silicic acid precipitates as a gel, and is separated. To the filtrate, sulfuric acid is added to form the basic zirconium sulfate. It is then necessary to add alkali to precipitate the basic zirconium sulfate, which is recovered and calcined to the oxide.

U.S. Pat. No. 3,281,207 to Meyer-Simon et al., dated Oct. 25, 1966, recovers zirconium compounds from alkali metal zirconium silicates using hydrochloric acid and sulfuric acid. A 30% solution of hydrochloric acid can be employed. The acid slurry is heated from one to two hours at 90 to 110° C. while stirring, until silicic acid precipitates. Silicic acid is filtered off, the excess acid in the filtrate is neutralized, and the basic zirconium sulfate which is precipitated is calcined to zirconium oxide.

U.S. Pat. No. 2,564,522 to de Rohden et al., dated Aug. 14, 1951, mixes finely ground zircon sand with sodium carbonate, and frits the mixture by heating to 950 to 1000° C. to form $Na_2SiZrO_5$. The $Na_2SiZrO_5$ is reacted with hydrochloric acid, forming $ZrOCl_2$. The reaction mixture is allowed to stand for at least four hours, preferably at a temperature between 50 and 100° C., until silica precipitates. Water is added to dissolve the $ZrOCl_2$, and filtered to remove the silica. A soluble sulfate, such as sodium sulfate, then is added to the solution to form the basic zirconium sulfate.

In both the de Rohden et al. process and the Meyer-Simon et al. process, if a pure zirconium sulfate is to be obtained, silica or silicic acid must be precipitated and separated before the zirconium sulfate can be precipitated. This precipitation of silica or silicic acid is slow, and the precipitate is frequently gelatinous, and hard to filter, thereby adding to the cost, and making the process less attractive commercially.

U.S. Pat. No. 3,445,199 to Fehr et al. dated May 20, 1969, describes preparation of a basic zirconium sulfate of the formula $2ZrO_2 \cdot SO_3 \cdot xH_2O$ convertible to industrial zirconium compounds by reacting sodium silico-zirconate frit in aqueous suspension with hydrochloric acid to dissolve the zirconium salt but not the silica, which remains in colloidal form. This requires a carefully controlled reaction in the cold, at not exceeding 25° C., and preferably 5 to 15° C., at a pH from 0.4 to 0.7, by incremental and/or gradual addition of the acid, using 5 to 10% in excess of 3 moles HCl per mole $ZrO_2$ of the suspension. The zirconium sulfate is formed and precipitated under carefully controlled conditions also, at a pH from 0.75 to 1.20, and at a temperature not exceeding 55° C., and preferably 35 to 50° C., since otherwise the colloidal silica may coagulate, and thus frustrate the desired separation, or gelation of the silica may even occur. Even so, the product contains substantial amounts of silica, for a calcined basic zirconium sulfate yields a $ZrO_2$ containing 0.05 to 0.3% $SiO_2$ (1% in Example 4) and 0.1 to 0.4% $Na_2O$, or 500 to 3000 p.p.m. $SiO_2$ (10,000 p.p.m. in Example 4) and 1000 to 4000 p.p.m. $Na_2O$.

A curious aspect of the Fehr et al. process is that the basic zirconium sulfate is formed in the presence of 6 to 8% HF based on the $ZrO_2$ content. The fluorine ions enable the precipitation and recovery of 80% or more of the zirconium content as basic zirconium sulfate. However, the reason for this is not explained, and it is apparent that it is not due to some zirconium fluorine compound, since the fluorine remains in solution, and does not appear in the precipitate, while 80% or more of the zirconium does precipitate.

In accordance with the present invention, processes are provided, via alkali metal zirconylosilicates, and/or zirconates and silicates, for preparing zirconium sulfate and derivatives thereof, starting from zirconium siliceous ores, wherein the zirconium sulfate is precipitated in an easily separated form from a clear solution of the alkali metal zirconylosilicate and/or zirconate and silicate, while the silica or silicic acid is held in solution without gelation, thereby greatly simplifying processing. In addition, the stoichiometric amount of hydrochloric acid is employed, so that there is substantially no excess acid present in the reaction mixture, sufficient to neutralize the alkali metal as the chloride and react with the zirconium oxide present, to form zirconyl chloride, dissolving the alkali metal zirconylosilicate and/or zirconate and silicate. Thus, it is not necessary to add an alkali to neutralize excess acid as in prior art processes, in order to precipitate basic zirconium sulfate. Dilute hydrochloric acid waste liquors, which are an inexpensive source of dilute hydrochloric acid, can be employed for dissolving the alkali metal zirconylosilicate and/or zirconate and silicate. The basic zirconium sulfate can be used as such, or converted into other zirconium compounds, such as zirconium oxide, on a commercial scale, and thus the process is useful generally for recovering zirconium values from zirconium siliceous ores.

The term "silicic acid" as used herein refers to the soluble form of silicon dioxide, as opposed to insoluble or colloidal forms, but does not mean that the soluble silicon dioxide is necessarily present as silicic acid.

PROCESS I

The first process for preparing basic zirconium sulfates and derivatives thereof comprises fusing a zirconium siliceous ore (such as zircon sand containing $ZrO_2 \cdot SiO_2$) with alkali metal carbonate or hydroxide to form an alkali metal zirconylosilicate and/or zirconate and silicate, reacting the alkali metal zirconylosilicate and/or zirconate and silicate with aqueous hydrochloric acid containing from about 2 to about 20% HCl to dissolve the alkali metal zirconylosilicate and/or zirconate and silicate, and form a clear solution of zirconyl chloride and silicic acid, adding an aqueous sulfate solution containing a sufficient amount of sulfate ion $SO_4^=$ and water to form a zirconium sulfate, and heating the solution at a temperature within the range from about 75 to about 100° C. to precipitate basic zirconium sulfate, while retaining the silicic acid in solution. The basic sulfate can be washed with acid to remove occluded solution.

The basic zirconium sulfate can be used as an intermediate for making many types of zirconium salts. It can be calcined, for example, at a temperature of 800° C. or higher, to form a monoclinic zirconium oxide containing less than 5000 p.p.m. $SiO_2$. This is a good commercial grade zirconia, useful as a polishing agent for glass. The basic zirconium sulfate also can be reacted with an alkali metal carbonate, such as sodium carbonate or potassium carbonate, which further can be reacted with an organic acid, such as acetic acid, or an alkali metal organic acid salt, such as alkali metal acetates, for example, sodium acetate, to form the corresponding zirconium salt, for instance, zirconium acetate.

The basic zirconium sulfate can, in addition, be reacted with sulfuric acid to form a zirconium acid sulfate, probably having the formula $H_2ZrO(SO_4)_2 \cdot 3H_2O$, which can be calcined to form zirconium oxide.

Process I in effect provides a route for forming zirconium oxide, containing less than 0.2% and even less than 100 p.p.m. silica, from zirconium siliceous ore such as zircon sand, in which silica is removed not by precipitation and filtration but by dissolution, and the zirconium separated by precipitation as a basic sulfate, while the silica remains in solution. Thus, the major portion of the silica in the product is that occluded in the solid and derived from that small portion of the mother liquor physically associated with the basic zirconium sulfate that cannot be removed by washing.

PROCESS II

Further in accordance with the invention, a series of zirconium sulfates containing bound fluorine, referred to hereinafter as zirconium fluosulfates, can be prepared by fusing a zirconium siliceous ore such as zircon sand ($ZrO_2 \cdot SiO_2$) with alkali metal carbonate or hydroxide to form an alkali metal zirconylosilicate, and/or zirconate and silicate, reacting the alkali metal zirconylosilicate and/or zirconate and silicate with aqueous hydrochloric acid containing from about 2 to about 20% HCl to form a clear solution of zirconyl chloride and silicic acid, adding an aqueous solution containing a sufficient amount of sulfate iron $SO_4^=$ and water to form a zirconium sulfate, adding a sufficient amount of fluoride ion to the solution to form zirconium fluosulfate $ZrOF_x(SO_4)_y$, $x$ probably having the value 0.1 to 1, more probably 0.4 to 0.8, and $y$ probably having the value 0.1 to 1, more probably 0.4 to 0.8, and heating the solution at a temperature within the range from about 50 to about 100° C., to precipitate the basic zirconium fluosulfate.

The basic zirconium fluosulfate can be calcined at a temperature of at least about 800° C. to form a zirconium oxide containing less than 0.2% $SiO_2$. It is also useful as a glass polishing component, in combination with known polishing agents, and in making ceramic colors, in combination with known colorants.

The basic zirconium fluosulfate can be reacted with sulfuric acid to form an acid zirconium fluosulfate containing less bound fluorine than in the starting material, and more bound sulfate. This is also useful in the same manner as the basic fluosulfate, and is referred to herein as the zirconium acid fluosulfate.

The zirconium acid fluosulfate can be heated at from about 100 to about 500° C., volatizing silicon and fluorine, and forming a zirconium pyrosulfate. This, when calcined at a temperature of at least 800° C., forms a zirconium oxide containing less than about 100 p.p.m. silica.

If desired, the zirconium acid fluosulfate can be calcined directly to form the oxide, without isolating the pyrosulfate. This is an inexpensive route to an otherwise difficultly accessible and expensive form of the oxide.

Process II in effect provides a route for forming zirconium oxide relatively free of silica from zirconium siliceous ores such as zircon sand, in which silica is removed not by precipitation and filtration but by dissolution, and the zirconium separated by precipitation as the fluosulfate, and any traces of silica are removed during calcining.

Further in accordance with the invention, compositions are provided for polishing glass comprising a basic zirconium sulfate or a basic or acidic zirconium fluosulfate in an amount within the range from about 5 to about 60% and preferably from about 5 to about 40% by weight of the polishing agent. Such compositions display an enhanced polishing effectiveness, as compared to either of these two ingredients taken separately.

PROCESS III

The invention also provides a further process for preparing zirconium oxide from zirconium siliceous ore, in which silicon is removed as $SiF_4$ or some other volatile silicon fluorine compound, from an acidic zirconium compound, such as zirconyl chloride or zirconium acid sulfate or fluosulfate.

A particular feature of Processes II and III of the invention is the removal of amounts within the range from the stoichiometrically equivalent amount to even traces of silica by calcining a zirconium compound in the presence of fluorine or a fluoride, either combined therewith or admixed therewith. The fluorine combines with the silica, and the silicon volatilizes, possibly as $SiF_4$, removing any silica by volatilization as the zirconium oxide is formed during calcining. This makes it possible to prepare zirconia containing less than 100 p.p.m. silica. This procedure is exemplified in Process II by the calcination of the zirconium acid fluosulfate, and in Process III by the calcination of zirconium acid salts and a fluoride.

FIG. 1 is a flowsheet showing the steps in preparing zirconium oxide from zircon sand via the basic zirconium sulfate, and intermediate products, and via the basic zirconium fluosulfate, and intermediate products.

The important reactions that are believed to take place in the above operations are as follows, using zircon sand as the illustrative zirconium siliceous ore:

PROCESS I (1) $\quad Na_2CO_3 + ZrO_2 \cdot SiO_2 \longrightarrow Na_2ZrSiO_5$ (2) $\quad Na_2ZrSiO_5 + HCl \longrightarrow ZrOCl_2 + \text{silicic acid}$ (3)
$ZrOCl_2 + \text{silicic acid} + H_2SO_4 \longrightarrow$
$\quad ZrO(OH)_x(SO_4)_y \cdot zH_2O \downarrow (+ SiO_2) \downarrow + \text{silicic acid}$ (4)
$ZrO(OH)_x(SO_4)_y \cdot zH_2O(+ SiO_2) \xrightarrow{\Delta}$
$\quad ZrO_2 + (SiO_2) + SO_2\uparrow + SO_3\uparrow$ (5)
$ZrO(OH)_x(SO_4)_y \cdot zH_2O(+ SiO_2) + H_2SO_4 \longrightarrow$
$\quad H_2ZrO(SO_4)_2 \cdot 3H_2O \downarrow + (SiO_2) \downarrow + H_2SO_4$

PROCESS II (1) $\quad Na_2CO_3 + ZrO_2 \cdot SiO_2 \longrightarrow Na_2ZrSiO_5$ (2) $\quad Na_2ZrSiO_5 + HCl \longrightarrow ZrOCl_2 + \text{silicic acid}$ (6)
$ZrOCl_2 + \text{silicic acid} + H_2SO_4 + NaF \longrightarrow$
$\quad ZrOF_x(SO_4)_y \cdot zH_2O(+ SiO_2) \downarrow + \text{silicic acid}$

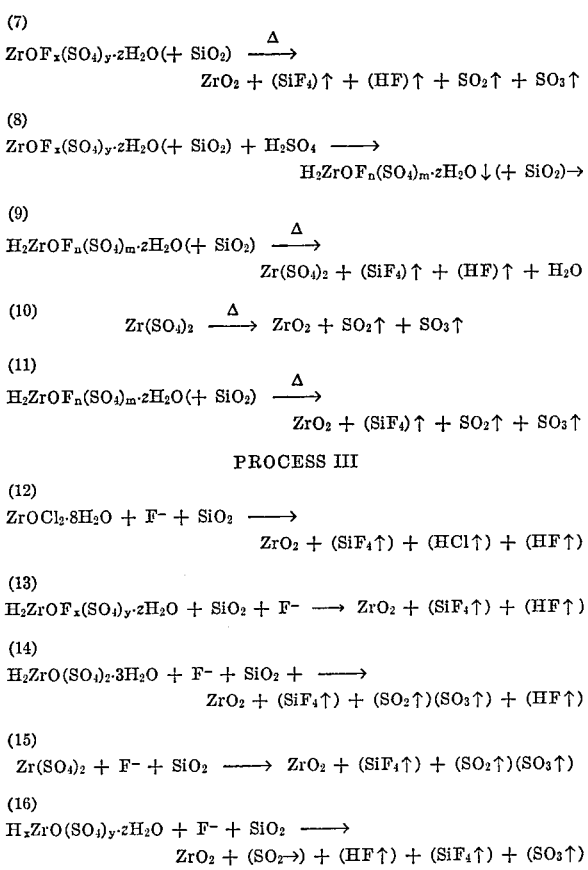

(7)
$$ZrOF_x(SO_4)_y \cdot zH_2O (+ SiO_2) \xrightarrow{\Delta} ZrO_2 + (SiF_4)\uparrow + (HF)\uparrow + SO_2\uparrow + SO_3\uparrow$$

(8)
$$ZrOF_x(SO_4)_y \cdot zH_2O(+ SiO_2) + H_2SO_4 \longrightarrow H_2ZrOF_n(SO_4)_m \cdot zH_2O \downarrow (+ SiO_2) \rightarrow$$

(9)
$$H_2ZrOF_n(SO_4)_m \cdot zH_2O(+ SiO_2) \xrightarrow{\Delta} Zr(SO_4)_2 + (SiF_4)\uparrow + (HF)\uparrow + H_2O$$

(10)
$$Zr(SO_4)_2 \xrightarrow{\Delta} ZrO_2 + SO_2\uparrow + SO_3\uparrow$$

(11)
$$H_2ZrOF_n(SO_4)_m \cdot zH_2O(+ SiO_2) \xrightarrow{\Delta} ZrO_2 + (SiF_4)\uparrow + SO_2\uparrow + SO_3\uparrow$$

PROCESS III

(12)
$$ZrOCl_2 \cdot 8H_2O + F^- + SiO_2 \longrightarrow ZrO_2 + (SiF_4\uparrow) + (HCl\uparrow) + (HF\uparrow)$$

(13)
$$H_2ZrOF_x(SO_4)_y \cdot zH_2O + SiO_2 + F^- \longrightarrow ZrO_2 + (SiF_4\uparrow) + (HF\uparrow)$$

(14)
$$H_2ZrO(SO_4)_2 \cdot 3H_2O + F^- + SiO_2 + \longrightarrow ZrO_2 + (SiF_4\uparrow) + (SO_2\uparrow)(SO_3\uparrow) + (HF\uparrow)$$

(15)
$$Zr(SO_4)_2 + F^- + SiO_2 \longrightarrow ZrO_2 + (SiF_4\uparrow) + (SO_2\uparrow)(SO_3\uparrow)$$

(16)
$$H_xZrO(SO_4)_y \cdot zH_2O + F^- + SiO_2 \longrightarrow ZrO_2 + (SO_2\rightarrow) + (HF\uparrow) + (SiF_4\uparrow) + (SO_3\uparrow)$$

In Reactions 7, 8, 9 and 11 the reactants contain small amounts of $SiO_2$, indicated by brackets, the major portion of which is probably volatilized as $SiF_4$ during calcination.

$x$, $y$, $m$ and $n$ represent the number of F and $SO_4$ radicals, and $z$ represents the number of $H_2O$. $n$ is less than $x$, and $y$ is less than $m$.

In the above reactions, the materials enclosed in parentheses are present only in trace amounts, that is, less than about 1% by weight of the total material present.

The above reactions are presented as a reasonable and possibly even probable explanation of what takes place, but the fact that they do take place has not been verified by experimental evidence.

The zirconium siliceous ore used in both processes of the invention can be zircon $ZrO_2 \cdot SiO_2$, baddeleyite $ZrO_2$ with silica, or complex silicates, such as are listed in Table 1.3, page 12 of Blumenthal, The Chemical Behavior of Zirconium, the disclosure of which is hereby incorporated by reference.

The ore is prepared by crushing or breaking up into small particles or powder. The finely divided powdered ore is referred to as zicron flour. In Processes I and II the zircon is then fused with alkali metal carbonate, such as sodium carbonate, or potassium carbonate, or alkali metal hydroxide, such as sodium or potassium hydroxide, to give the alkali metal zirconyl silicate and/or zirconate silicate.

The zirconium siliceous ore and an alkali metal carbonate or hydroxide such as sodium or potassium carbonate or hydroxide, in an equivalent ratio $M_2CO_3:ZrO_2$ or $2MOH:ZrO_2$ (M is an alkali metal) within the range from about 1:2 to about 3:1, and preferably within the range from about 0.9:1 to about 1.2:1, are fused at a temperature above the melting point of the mixture up to about 200° C. above the melting point. The fritted alkali metal zirconylosilicate and/or zirconate and silicate thus formed is dissolved in a dilute aqueous solution of hydrochloric acid, containing less than 20% HCl. There is no lower limit on concentration, and 2% HCl can be used, but the concentration is preferably from about 5 to about 8% HCl. If less than a 2% aqueous solution of hydrochloric acid is employed, silicic acid tends to gel.

The amount of HCl added should be not more than that sufficient to take up the alkali metal and to form zirconyl chloride with the zirconium oxide present, in order to ensure that substantially all of the HCl will be reacted and substantially no excess acid remains.

It is important that the alkali metal zirconylosilicate and/or zirconate and silicate be converted to zirconyl chloride and silicic acid, both of which are fully dissolved, to form a clear solution, by reaction with a stoichiometric amount and preferably not an excess of hydrochloric acid as aqueous hydrochloric acid in a molar ratio $HCl:ZrO_2$ within the range from not less than 3.5:1 to about 5:1 and preferably within the range from about 4:1 to about 4.5:1. Two moles of hydrochloric acid are taken up to neutralize the alkali metal of the fritted alkali metal zirconylosilicate and/or zirconate and silicate. The insoluble residual materials from the zircon ore are then separated, for example, by filtration or centrifuging, to recover a clear aqueous solution of zirconyl chloride and silicic acid.

Zirconyl chloride is only formed if the molar ratio of $HCl:ZrO_2$ is high enough. If the molar ratio is above 3.5:1, and about 4:1, or higher, the zirconyl chloride has the probable formula $ZrOCl_2$. If the molar ratio is below 3.5, and above 3:1, zirconyl hydroxy chloride $$ZrO(OH)Cl$$

is formed. Moreover, under these conditions, the silica is not dissolved, but is in colloidal form, and has a tendency to gel.

The reaction of the aqueous hydrochloric acid and the alkali metal zirconylosilicate and/or zirconate and silicate can be carried out at room temperature, but proceeds more rapidly at elevated temperatures. Suitable rates of reaction are obtained at temperatures within the range from about 25° C. to about 100° C. As the reaction temperature is increased, however, there may be a tendency for silicic acid to gel, and thus the temperature selected is less than the gelation temperature in any case. When the reaction is carried out at 25° C., a reaction time within the range from about three to about four hours is required, for a good yield of zirconyl chloride.

The basic zirconium sulfate is prepared by reacting an aqueous solution containing sulfate ions $SO_4^=$ with selected proportions of aqueous solution of zirconyl chloride and silicic acid. The proportions can be varied in a molar ratio of $SO_4:ZrO_2$ within the range from about 0.2:1 to about 1:1. The preferred ratio is about 0.5:1 to about 0.6:1. The aqueous sulfate solution should contain a $ZrO_2$ concentration high enough to precipitate the basic zirconium sulfate. It is preferred to operate at a $ZrO_2$ concentration within the range from about 0.75 to about 1.5%. The $ZrO_2$ concentration can be as low as 0.25%, and still obtain precipitation of the basic sulfate.

The concentration of silicic acid (calculated as $SiO_2$) should be less than 0.75, to avoid precipitation or gelation of silica or silicic acid.

The concentrations of silica and zirconia are interrelated only to the extent that both are supplied with the zirconium siliceous ore. Ores containing lower silica contents supply correspondingly less silica, and correspondingly higher zirconia concentrations can be reached without danger of silica or silicic acid precipitation or gelation.

Any source of sulfate can be employed, such as sulfuric acid, alkali metal sulfates, such as sodium sulfate, potassium sulfate, and lithium sulfate, and ammonium sulfate. Sulfuric acid and sodium sulfate are preferred.

After adding the aqueous sulfate solution to the solution of zirconyl chloride and silicic acid, the mixture is heated at a temperature within the range from about 75 to about 100° C., and preferably within the range from about 90 to about 100° C., to effect reaction, which is evidenced by formation of a precipitate of the basic zirconium sulfate. At a reaction temperature of 75° C., a reaction time of almost 4 hours may be required for a good yield. If a reaction temperature of 90° C. is employed, the reaction time required is only about one hour. If the mixture is heated to about 100° C., the reaction is complete almost at once.

The basic zirconium sulfate precipitate can be separated from the remainder of the reaction mixture by conventional separatory procedures, such as filtration, or centrifuging. The basic zirconium sulfate product has a small silica content, less than about 1% on a $ZrO_2$ basis, and a negligible alkali metal content. If washed to remove the alkali metal, and calcined at temperatures of 800° C. or higher, monoclinic zirconium oxide is obtained of excellent quality for a glass polish. If calcined with a cubic lattice stabilizer, such as calcium oxide or magnesium oxide, or yttrium oxide, a cubic zirconium oxide is obtained, also suitable for a glass polish. The prime use for cubic zirconium oxide is as a high-temperature refractory. Both monoclinic and cubic forms are also useful as polishing agents for silicon and germanium.

The basic zirconium fluosulfate is obtained by reaction of the solution of zirconyl chloride and silicic acid, prepared as described hereinbefore, with an aqueous solution containing both sulfate $SO_4^=$ and fluoride ions. The molar ratio $F:ZrO_2$ should be within the range from about 0.1:1 to about 1:1, and preferably from about 0.4:1 to about 0.8:1, and the molar ratio $SO_4:ZrO_2$ should be within the range from about 0.1:1 to about 1:1, and preferably from about 0.4:1 to about 0.8:1. There is less fluorine in the product than in the solution; thus, a $F:ZrO_2$ ratio of 1:1 in the solution may give a 0.8:1 ratio in the product, and correspondingly less sulfate.

In forming the zirconium fluosulfates, the silicic acid concentration can be higher, up to about 1.3% before precipitation or gelation of silica or silicic acid occurs.

Any water-soluble source of fluoride ion can be employed. The cation portion should not form a precipitate in the reaction mixture. Sodium fluoride and hydrofluoric acid are preferred. Other alkali metal fluorides such as potassium fluoride, lithium fluoride, and potassium zirconium fluoride can be used, as well as ammonium fluoride and ammonium bifluoride.

The solution is maintained at a temperature within the range from about 50 to 100° C. and preferably within the range from about 60 to about 70° C. until reaction is obtained, as evidenced by formation of a precipitate of basic zirconium fluosulfate. The higher the fluoride content, the lower the reaction temperature that can be employed. The lower the temperature, the less the tendency for gelation of silicic acid, and thus higher fluorine ratios are preferred.

The basic zirconium fluosulfate can be calcined at a temperature of at least 800° C. and forms monoclinic zirconium oxide containing less than about 0.2% silica. In the calcination step, any silicon entrained in the zirconium fluosulfate is volatilized, and the product therefore has a lower silicon content that the obtained from the basic zirconium sulfate.

The basic zirconium fluosulfate can be reacted with aqueous sulfuric acid in any concentration to yield a final sulfuric acid concentration within the range from about 50 to about 70%, and preferably within the range from about 54 to about 58% by weight of the reaction mixture, at a temperature within a range from about 25° C. to about 140° C., and preferably within the range from about 80 to about 120° C. The zirconium acid fluosulfate precipitates on cooling to ambient temperatures.

The acidic zirconium fluosulfate provided has a molar ratio $F:ZrO_2$ of about 0.05:1 to 0.5:1; a molar ratio $SO_4^=:ZrO_2$ of about 1.8 to 2.5:1. The acid zirconium sulfate is a white crystalline solid which loses fluorine slowly at room temperature and more rapidly at elevated temperatures.

If the zirconium acid fluosulfate is heated, fluorine and silicon are split out, and a relatively pure water-soluble anhydrous zirconium pyrosulfate is formed. The zirconium pyrosulfate can be calcined at a temperature within the range from about 800 to about 1000° C. to form a monoclinic zirconium oxide which contains less than about 100 p.p.m. silica. This thus forms a route to a substantially pure (silicon-free) zirconium oxide.

This is the basis of Process III, in which a zirconium compound is either converted to a fluoride or is calcined in the presence of fluorine, either as hydrogen fluoride, ammonium fluoride, or a metal fluoride, such as an alkali metal or alkaline earth metal fluoride. The fluorine may result in volatilization of silica as $SiF_4$ or as some other volatile fluoride. The product of such a calcination is a quite pure zirconia, containing less than 100 p.p.m. silica.

Any alkali metal or alkaline earth metal fluoride can be used, such as sodium fluoride, potassium fluoride, sodium bifluoride, calcium fluoride, magnesium fluoride, strontium fluoride, or barium fluoride.

Hydrogen fluoride and ammonium fluoride are preferred, because no metal salt residue is left.

The amount of fluorine added is at least sufficient to react with all the silica present, preferably with no excess, to minimize contaminants.

Calcination is carried out in air or oxygen, at from about 800° to about 1000° C.

In each of these calcination steps, addition of a cubic lattice stabilizer, such as yttrium, calcium and/or magnesium oxide, will result in a stable cubic zirconium oxide, of a remarkably low silica content.

The basic zirconium fluosulfate can be employed in the preparation of zirconium fluocarbonate, by reaction of the zirconium fluosulfate with stoichiometric amounts of ammonium carbonate or an alkali metal carbonate. The zirconium fluocarbonate can be reacted with a stoichiometric amount of an organic acid such as acetic acid to form zirconium acetate. These are known salts, of known utilities.

The basic and acidic zirconium fluosulfates can be employed as a starting material as a replacement for zirconium dioxide in making ceramic colors. One type of ceramic color in which it is particularly useful is disclosed in U.S. Pat. No. 2,441,447. The zirconium fluosulfate can be mixed with vanadium oxide, silica, and optionally sodium fluoride, and this mixture is fired at temperatures within the range from about 800 to about 1000° C. Without sodium fluoride, a green ceramic color is obtained. With sodium fluoride, a blue ceramic color is obtained.

In accordance with the instant invention, the polishing action of glass polishing agents such as zirconium oxide, silicon dioxide, zirconium silicate and cerium oxide can be considerably improved by incorporating therewith an acidic or basic zirconium fluosulfate. In fact, the polishing action can by this means be increased by as much as approximately 25%. These results are quite surprising, inasmuch as the fluosulfates when used alone display virtually no polishing action. The fact that they can increase the polishing action of these compounds is therefore quite unexpected, and is indicative of an enhanced or synergistic effect.

As little as 0.25% zirconium fluosulfate will considerably improve the polishing ability of the polishing agent such as cerium oxide, silica, zirconium oxide or zirconium silicate. The upper limit of the amount is the point at which polishing efficiency of the oxide begins to be impaired, an effect probably due to the lack of polishing power of the additive when used alone. This limit usually is not reached until the composition contains more than 50% additive. Preferably, from 5% to 40% zirconium fluosulfate is employed. All weights are based on the weight of the polishing agent.

The glass polishing composition is readily prepared by mixing the polishing oxide or silicate with the zirconium fluosulfate and with water to form a suspension which is then used in the conventional way in glass polishing apparatus.

The polishing is carried out in the conventional way at room temperature by applying the composition to the glass and then polishing with a felt or other type of polishing pad. The standard commercial bowl polisher is quite satisfactory. Water should be added from time to time to compensate for evaporation loss and maintain a constant concentration, but this is not essential.

The following examples in the opinion of the inventors represent the best embodiments of their invention.

EXAMPLE 1

A mixture of finely divided zircon flour (900 g.) containing about 65% $ZrO_2$ (about 35% $SiO_2$) and sodium carbonate (514 g.) was fused in air at about 950° C. for four hours, to form a fritted product containing sodium zirconium silicate. The mass was cooled, and the sodium zirconium silicate (1150 g.) dissolved in aqueous 7.2% hydrochloric acid (9920 g.) forming a clear solution. The mixture was stirred at room temperature for five hours. The trace amounts of unreacted material that remained undissolved were filtered and the cake washed with 1% HCl. The combined filtrates contained in solution about 4.0% $ZrO_2$ as zirconyl chloride and 2.2% $SiO_2$ as silicic acid. To the filtrate was added about 288 g. of concentrated sulfuric acid in about 23.5 kg. of water. The concentration of $ZrO_2$ in the resulting solution was less than about 1.5%. The mixture was then heated at 96° C. until the white precipitate of basic zirconium sulfate ceased to form. The precipitate was filtered from the reaction mixture and was analyzed.

Found: 28.0% $ZrO_2$, 13.2% $SO_4^=$. This corresponds to basic zirconium sulfate of the formula $5ZrO_2 \cdot 3SO_4 \cdot xH_2O$.

100 g. of the basic zirconium sulfate product was calcined at about 950° C. for 3 hours. Monoclinic zirconium oxide containing less than 5000 p.p.m. $SiO_2$ was obtained. This material is useful as a glass, silicon and germanium polish, as a component in piezoelectric materials, a starting materail for ceramic pigments, and high temperature refractories.

EXAMPLE 2

A mixture of a zircon flour and sodium carbonate as in Example 1 was calcined in air at about 1000° C. for about four hours to form sodium zirconium silicate. This was dissolved in 6.9% aqueous hydrochloric acid (9800 g.) by stirring at room temperature. A clear solution containing zirconyl chloride and silicate acid was formed. The trace quantity of unreacted residual material was filtered from the reaction mixture.

Dilute sulfuric acid (263 g. in 45 0g.$H_2O$) and sodium fluoride (126 g.) were added to the solution of zirconyl chloride and silicic acid, followed by the addition of 23.5 kg. of 97° C. water. The reaction mixture was maintained at a temperature of about 65° C. for one hour. Zirconium fluosulfate precipitated from the mixture as a white amorphous solid, which was analyzed:

Found: 2.6% F, 25.7% $ZrO_2$ and 12.0% $SO_4^=$.

The fluorine in this compound is chemically bound. The following experiment shows this:

710 g. of zirconium fluosulfate was added to a slurry of 200 g. of ammonium bicarbonate in 600 g. of water. A precipitate formed which was filtered and washed. The cake contained about 30.1% zirconium as $ZrO_2$ and about 2.2% F as fluoride. Thus, it can be seen that most of the fluorine remains with the zirconium, which indicates that the fluorine is chemically bound with the zirconium.

49 g. of this basic zirconium fluosulfate, 0.9 g. of vanadium pentoxide, 6 g. of silica and 0.5 g. of sodium fluoride were fired at a temperature of about 900° C. for about two hours to yield a soft cake which disintegrated into fine blue powdered ceramic color.

49 g. zirconium fluosulfate, 0.9 g. vanadium pentoxide, and 6 g. silica were fired at 900° C., and gave a fine powder having a green color, which is lighter than the green color obtained using zirconium oxide in place of the basic zirconium fluosulfate.

These blue and green powders are useful in making blue and green ceramic tiles and other ceramic objects. The blue and green powders can also be used as opacifiers in ceramic products.

The zirconium fluosulfate was used as a component of glass polishing compositions based on various glass polishing agents.

A standardized polishing test was used to evaluate the polishing efficiency of these compositions against control compositions based on the same glass polishing agent without the zirconium fluosulfate. The amount of the polishing composition to be evaluated was thoroughly mixed with 150 ml. of water to form a slurry containing 33% solids, and a weighted glass disk 2 inches in diameter was then polished for thirty minutes with the resulting slurry, using an American Optical Bowl Polisher, equipped with felt pads, applying a pressure to the glass disk of 15 p.s.i. at 200 r.p.m. The glass disk was examined for quality of polish and weighed to determine the weight loss in milligrams every ten minutes. The test was repeated without changing the slurry for several test disks, and the values reported were the average of the series of tests for each slurry. The pH of each polishing slurry was also noted, and is recorded in the table which follows.

| No. | Polish formulation | pH | Removal rate (mg./10 min.) |
|---|---|---|---|
| A | Lustrox M (zirconium oxide) | 8.7 | 190 |
| B | 95% Lustrox M and 5% zirconyl fluosulfate | 5.3 | 193 |
| C | 91% Lustrox M and 9% zirconyl fluosulfate | 5.1 | 216 |
| D | 85% Lustrox M and 15% zirconyl fluosulfate | 3.9 | 221 |
| E | 50% Lustrox M and 50% zirconyl fluosulfate | 2.5 | 150 |
| F | Ultrox 1000 (325 mesh zirconium silicate) | 7.4 | 131 |
| G | 95% Ultrox 1000 and 5% zirconyl fluosulfate [1] | 6.0 | 144 |
| H | 91% Ultrox 1000 and 9% zirconyl fluosul. [1] | 6.0 | 155 |
| I | 85% Ultrox 1000 and 15% zirconyl fluosulfate [1] | 6.0 | 166 |
| J | 50% Ultrox 1000 and 50% zirconyl fluosulfate [1] | 6.0 | 144 |

[1] pH adjusted with caustic.

In all cases, the glass surfaces were free of damage, such as scratching, orange peel and pitting.

It is apparent from the test data, Nos. B to E and G to J, vis-a-vis Controls A and F, that the addition of zirconyl fluosulfate in amounts within the range from 5 to 15% considerably increased in polishing efficiency. At 50% zirconyl fluosulfate, in Example J, polishing efficiency is still greater than with the polishing agent alone, when the polishing agent was zircon ore, but this was not true when the polishing agent was zirconium oxide (Example E). A graph of the data shows that an improvement in polishing efficiency can be expected in amounts within the range from about 5% to about 40% zirconyl fluosulfate, and that beyond 40%, an improvement may be noted in amounts up to 60%, but that this is not true in every case.

EXAMPLE 3

100 g. of the basic zirconium fluosulfate produced in accordance with Example 2 was calcined at a temperature of about 800° C., forming zirconium oxide containing less than 0.2% silica. The major portion of the silicon present in the basic zirconium fluosulfate was volatilized.

EXAMPLE 4

150 g. of the basic zirconium fluosulfate produced in accordance with Example 2 was reacted with sulfuric acid (97%, 150 g.) to form an acid zirconium sulfate, which precipitated as a crystalline solid, and was filtered out. The filtered solid was analyzed, and found to contain about one-half of the fluorine in the starting material.

A portion of the acid fluosulfate was heated at about 220° C., thereby volatilizing silica and forming anhydrous zirconium pyrosulfate.

One portion of zirconium pyrosulfate is calcined at 900° C., forming a monoclinic zirconium oxide containing less than 100 p.p.m. silica. To another portion is added 0.0825 mole CaO and 0.0275 mole MgO, followed by calcining at 1100° C. A stable cubic zirconium oxide is formed, containing less than 100 p.p.m. silica. Both forms are useful as glass, silicon and germanium polishes, as a component in piezoelectric materials, a starting material for ceramic pigments and high temperature refractories.

Another portion of the acid fluosulfate is made into a glass polish composition composed of 42.5 g. of cerium oxide and 7.5 g. of zirconium fluosulfate. The zirconium fluosulfate improves the polishing effectiveness of the cerium oxide.

EXAMPLE 5

A glass polish composition is prepared composed of 42.5 g. commercial silica or white rouge and 7.5 g. basic zirconium fluosulfate. The zirconium fluosulfate greatly improves the polishing effectiveness of the white rouge.

EXAMPLE 6

A composition is prepared composed of 47.5 g. finely divided zirconium silicate and 2.5 g. acid zirconium fluosulfate. The zirconium fluosulfate greatly improves the polishing effectiveness of the white rouge.

Having regard to the foregoing disclosure, the following is claimed as the inventive and patentable embodiments thereof:

1. A process for preparing basic zirconium sulfates and derivatives thereof, which comprises fusing zirconium siliceous ore with a member selected from the group consisting of alkali metal carbonate and alkali metal hydroxide to form a member selected from the group consisting of alkali metal zirconylosilicate, a mixture of alkali metal zirconate and alkali metal silicate, and mixtures thereof, reacting the member selected from the group consisting of alkali metal zirconylosilicate, a mixture of alkali metal zirconate and alkali metal silicate, and mixtures thereof at a temperature within the range from about 25° C. to about 100° C., with aqueous hydrochloric acid containing from about 2 to about 20% HCl in a molar ratio $HCl:ZrO_2$ within the range from not less than 3.5:1 to about 5:1 to dissolve the member selected from the group consisting of alkali metal zirconylosilicate, a mixture of alkali metal zirconate and alkali metal silicate, and mixtures thereof in the hydrochloric acid and form a clear solution of zirconyl chloride and silicic acid, adding an aqueous sulfate solution containing a sufficient amount of sulfate ion $SO_4^=$ to provide a molar ratio of $SO_4^=:ZrO_2$ within the range from about 0.2:1 to about 1:1 to form zirconium sulfate, and heating the solution at a temperature within the range from about 75 to about 100° C. to precipitate basic zirconium sulfate.

2. A process in accordance with claim 1 wherein the zirconium siliceous ore is zircon.

3. A process in accordance with claim 2 wherein the molar ratio of $HCl:ZrO_2$ present in the zirconyl chloride is within the range from about 4:1 to about 4.5:1.

4. A process in accordance with claim 1 wherein the molar ratio of $SO_4^=:ZrO_2$ present in the zirconyl chloride-silicic acid solution is within the range from about 0.5:1 to about 0.6:1.

5. A process in accordance with claim 1 wherein the aqueous sulfate solution is aqueous sulfuric acid.

6. A process in accordance with claim 1 in which the solution is heated at a temperature within the range from about 90 to about 100° C.

7. A process in accordance with claim 1 which comprises calcining the basic zirconium sulfate at a temperature of at least about 800° C. to form zirconium oxide.

8. A process in accordance with claim 1 which comprises reacting the basic zirconium sulfate with an alkali metal carbonate to form zirconium carbonate.

9. A process in accordance with claim 8, which comprises reacting the zirconium carbonate with a member selected from the group consisting of acetic acid and alkali metal acetates, to form zirconium acetate.

10. A process in accordance with claim 1 which comprises reacting the basic zirconium sulfate with sulfuric acid to form a zirconium acid sulfate having the formula $H_2ZrO(SO_4)_2 \cdot 3H_2O$.

11. A process in accordance with claim 10 including the step of calcining the acid zirconium sulfate to form zirconium oxide.

12. A process in accordance with claim 1 which comprises calcining the basic zirconium sulfate with a cubic zirconium oxide lattice stabilizer to form a cubic zirconium oxide.

References Cited

UNITED STATES PATENTS

| | | | |
|---|---|---|---|
| 1,658,807 | 2/1928 | Kinzie | 23—22 X |
| 2,387,046 | 10/1945 | Wainer | 23—24 Z |
| 3,389,005 | 6/1968 | Kloepfer et al. | 23—140 X |
| 2,564,522 | 8/1951 | Rohden et al. | 23—24 Z |
| 3,510,254 | 5/1970 | Bell | 23—23 X |
| 3,514,252 | 5/1970 | Levy et al. | 23—22 |
| 3,109,704 | 11/1963 | Olly | 23—18 |
| 3,168,374 | 2/1965 | Meyer-Simon et al. | 23—117 |
| 3,445,199 | 5/1969 | Fehr et al. | 23—140 X |

HERBERT T. CARTER, Primary Examiner

U.S. Cl. X.R.

23—24 Z, 18, 19, 61, 117, 140; 260—429.3

PO-1050
(5/69)

UNITED STATES PATENT OFFICE
CERTIFICATE OF CORRECTION

Patent No. 3,672,825          Dated June 27, 1972

Inventor(s) J. R. Gambale et al

It is certified that error appears in the above-identified patent and that said Letters Patent are hereby corrected as shown below:

Column 1, line 42 : "precipitate" should be --precipitates--

Column 1, line 73 : change the period "(.)" to a comma --(,)-- after "filter"

Column 3, line 53 : "iron" should be --ion--

Column 3, line 74 : "volatizing" should be --volatilizing--

Column 5, line 8 : "(+ $SiO_2$)→" should be --(+ $SiO_2$) ↓ --

Column 5, line 35 : "($SO_2$ →)" should be --($SO_2$ ↑ )--

Column 5, line 50 : "vertified" should be --verified--

Column 5, line 60 : "zicron" should be --zircon--

Column 5, line 64 : insert "and" after --zirconate--

Column 6, line 62 : "0.75" should be --0.75%--

Column 7, line 62 : insert "than" after --content-- and delete the "the" after --that--

Column 9, line 44 : "materail" should be --material--

Column 9, line 53 : "silicate" should be --silicic--

Column 10, line 33 : "(mg./10 min." should be --(mg./10 min.)--

Signed and sealed this 6th day of February 1973.

(SEAL)
Attest:

EDWARD M. FLETCHER, JR.
Attesting Officer

ROBERT GOTTSCHALK
Commissioner of Patents